April 12, 1927.  C. A. PARSONS ET AL  1,624,430
DEVICE SUITABLE FOR MEASURING THE AXIAL THRUST OF ROTATABLE SHAFTS
Filed March 11, 1925   7 Sheets-Sheet 1

INVENTORS:
CHARLES A. PARSONS
STANLEY S. COOK

April 12, 1927. 1,624,430
C. A. PARSONS ET AL
DEVICE SUITABLE FOR MEASURING THE AXIAL THRUST OF ROTATABLE SHAFTS
Filed March 11, 1925 7 Sheets-Sheet 2

INVENTORS:
CHARLES A. PARSONS
STANLEY S. COOK

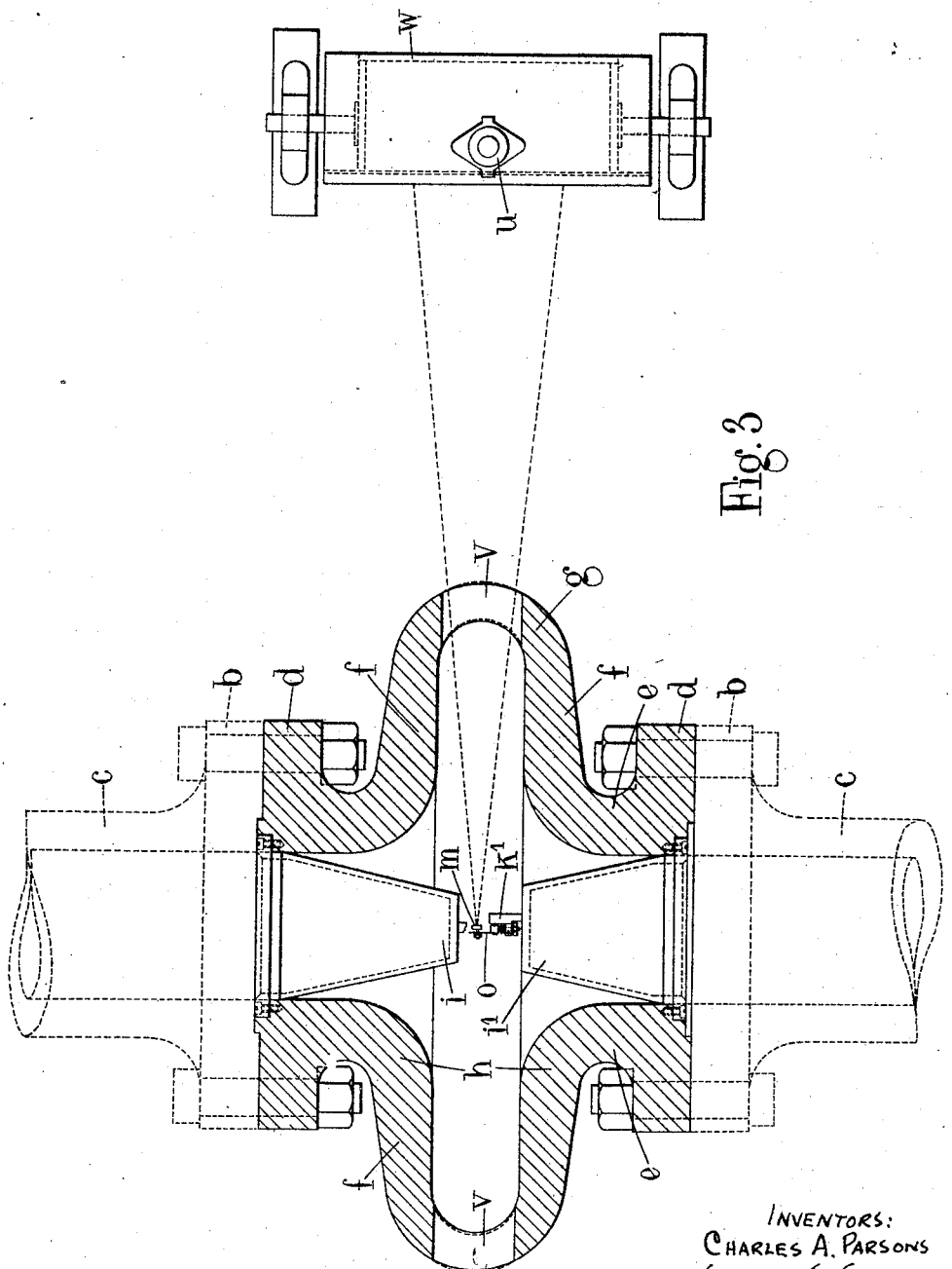

April 12, 1927.
C. A. PARSONS ET AL
1,624,430
DEVICE SUITABLE FOR MEASURING THE AXIAL THRUST OF ROTATABLE SHAFTS
Filed March 11, 1925   7 Sheets-Sheet 4
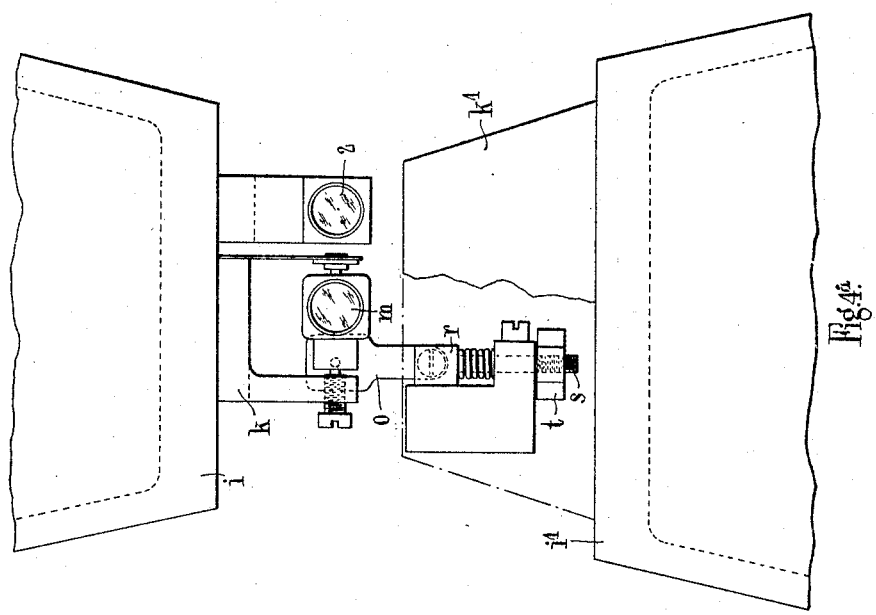
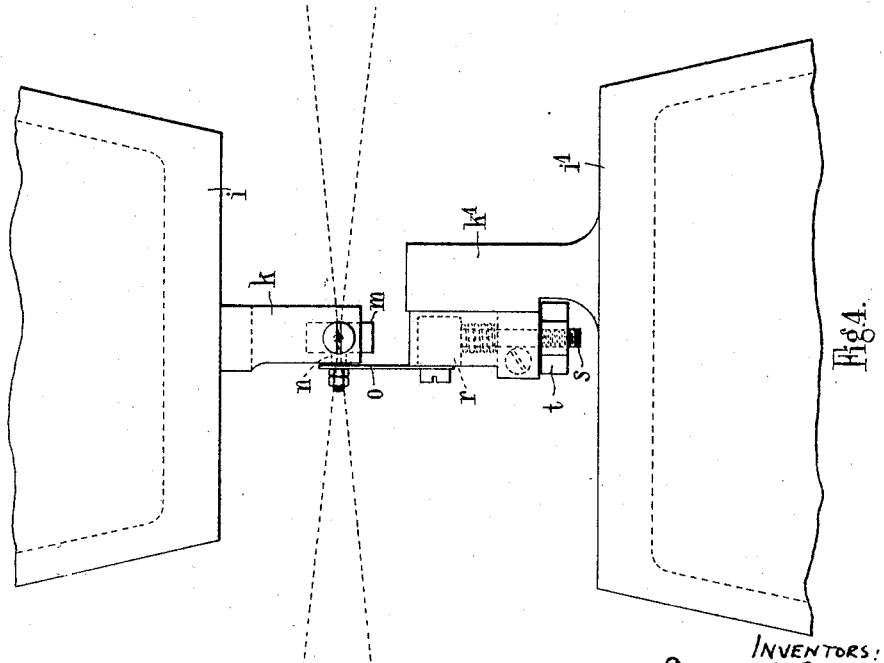
INVENTORS:
CHARLES A. PARSONS,
STANLEY S. COOK
by Spear, Middleton, Donaldson, Hall
Attys.

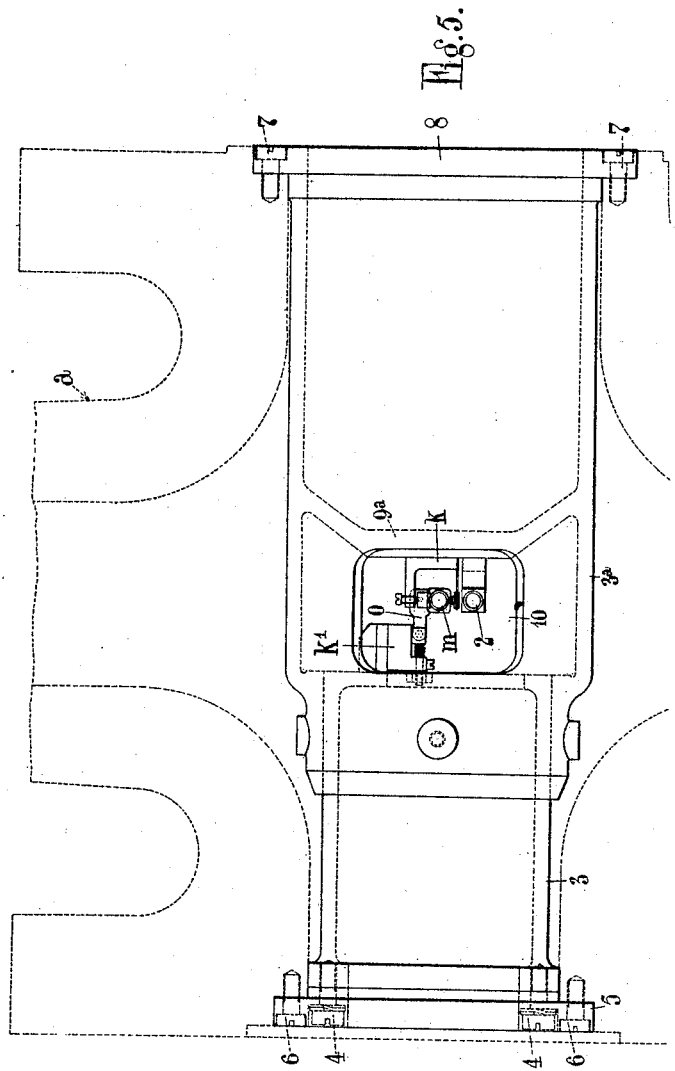

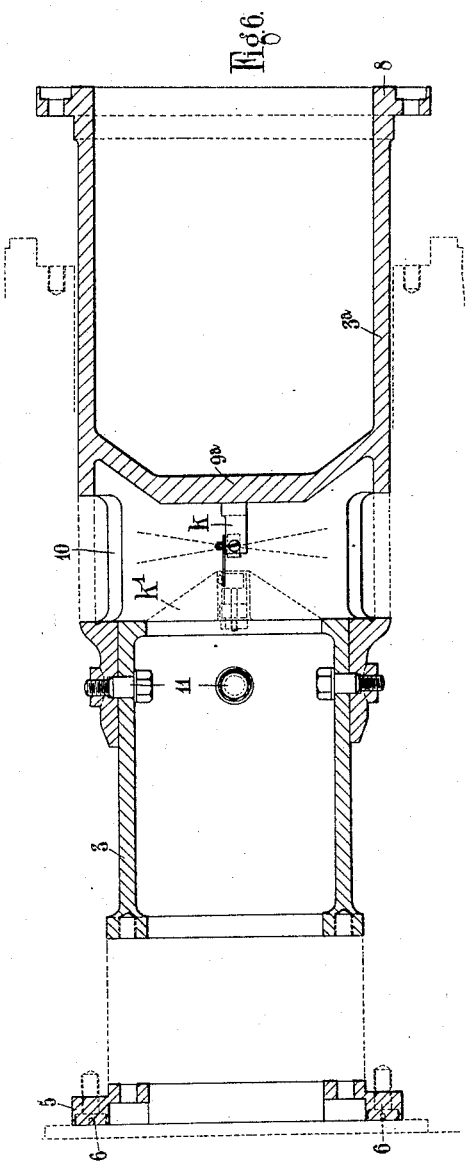

April 12, 1927.
C. A. PARSONS ET AL
1,624,430
DEVICE SUITABLE FOR MEASURING THE AXIAL THRUST OF ROTATABLE SHAFTS
Filed March 11, 1925     7 Sheets-Sheet 7
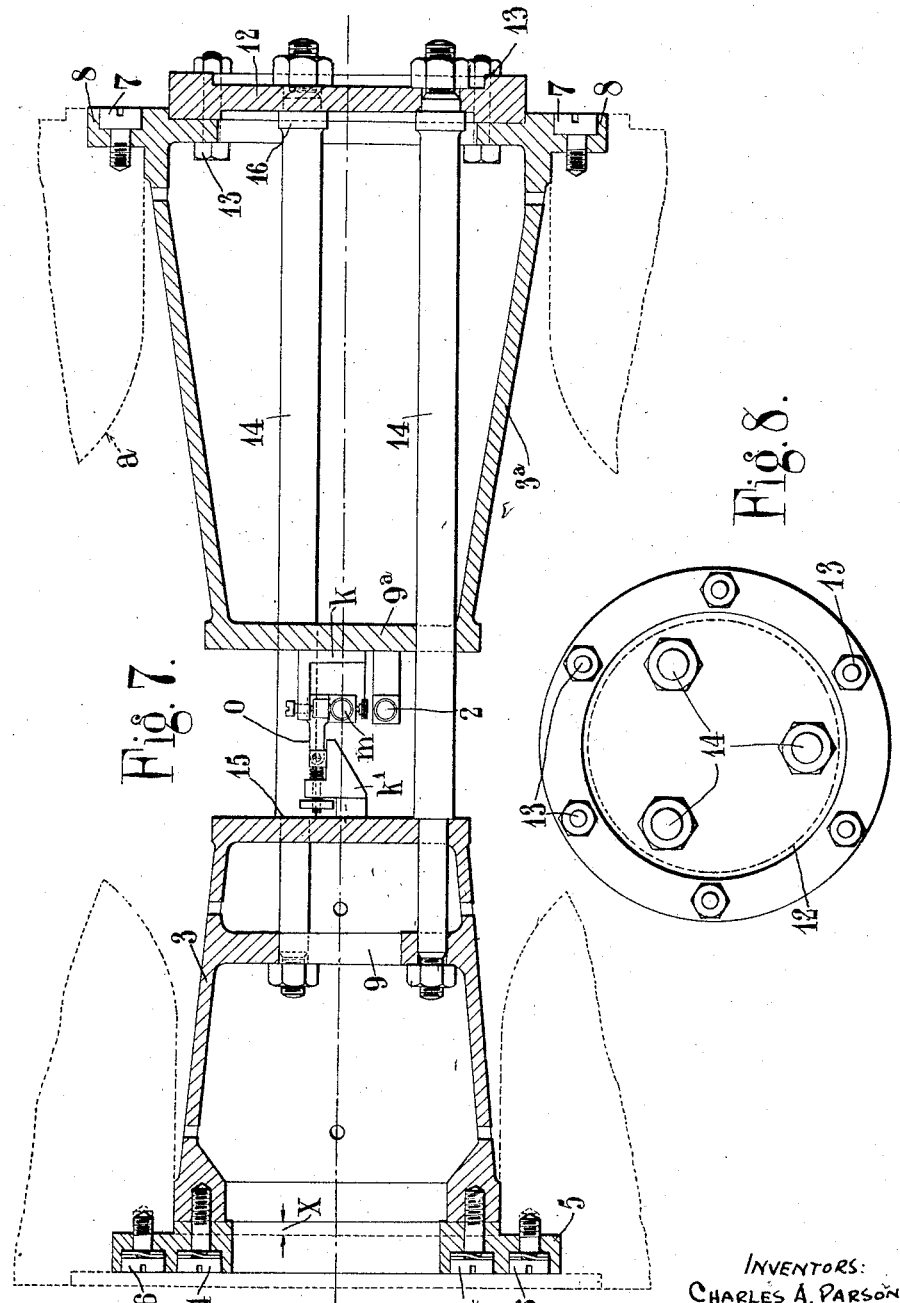
INVENTORS:
CHARLES A. PARSONS,
STANLEY S. COOK.

Patented Apr. 12, 1927.

1,624,430

UNITED STATES PATENT OFFICE.

CHARLES ALGERNON PARSONS AND STANLEY SMITH COOK, OF NEWCASTLE-ON-TYNE, ENGLAND; SAID COOK ASSIGNOR TO SAID PARSONS.

DEVICE SUITABLE FOR MEASURING THE AXIAL THRUST OF ROTATABLE SHAFTS.

Application filed March 11, 1925, Serial No. 14,659, and in Great Britain April 3, 1924.

The invention relates to devices suitable for measuring the axial thrust of a rotatable shaft and is especially applicable to measuring the thrust of a marine propeller.

The invention consists in the combination of elements hereinafter described and particularly pointed out in the claims.

Referring to the accompanying drawings, which are to a certain extent of a diagrammatic nature:—

Figure 3 is a corresponding plan view for the most part in section, and

Figures 4 and 4ª are views to a larger scale showing details of the movable mirror and adjusting gear;

Figure 5 shows an elevation of another form of the invention in which the mirror-supporting and mirror-operating parts can be withdrawn as a single unit, Figure 6 being a corresponding sectional plan showing these parts partly withdrawn; while Figure 7 shows in sectional elevation a modification of the form illustrated in Figure 5, Figure 8 being an end view of the plate and bolts for securing the mirror-supporting and mirror-operating parts together.

Corresponding parts in the different figures are denoted by the same reference symbols.

Figure 1:
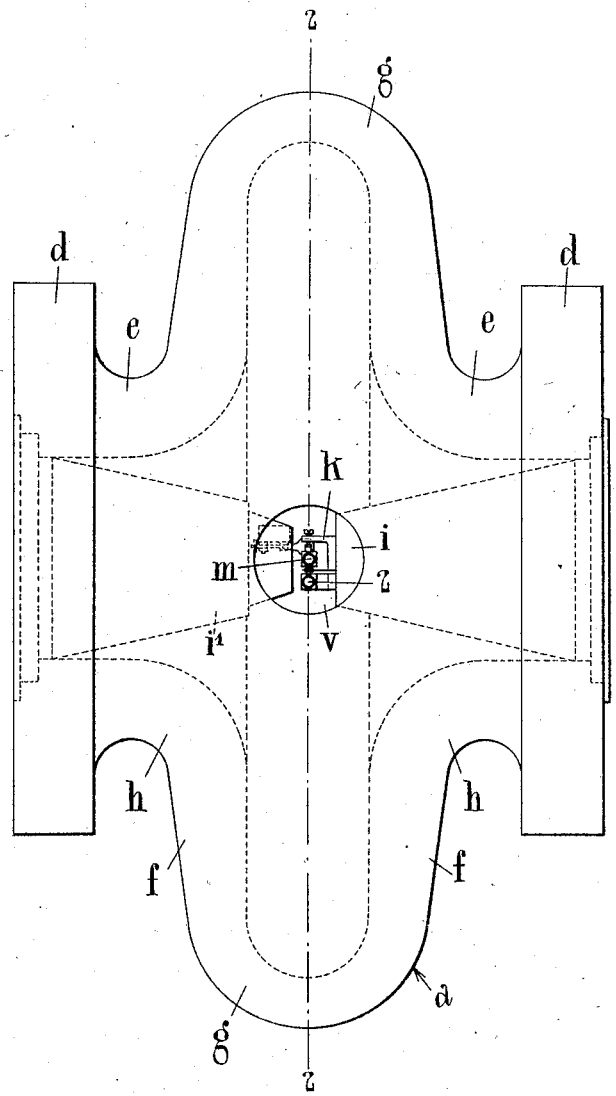
Figure 1 shows an elevation of one form of the invention in which the bellows or concertina member takes the form of an annular corrugation.
Figure 2:
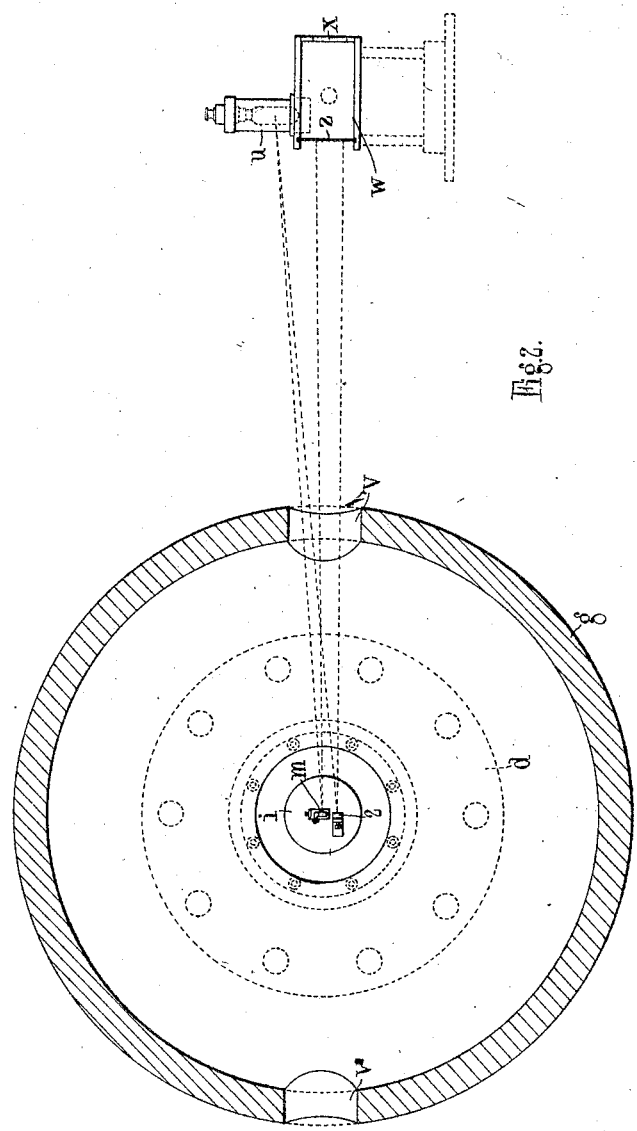
Figure 2 is a cross-section on the line 2—2 of Figure 1, showing in addition the lamp and scale-box.

In carrying the invention into effect according to the form shown in Figures 1 to 4ª for measuring the thrust of a ship's propeller, the deformable bellows or concertina device indicated as a whole by the arrowed letter, $a$, is inserted between the flanges, $b$, $b$, of adjacent lengths of the propeller shaft, $c$, $c$, (see Figure 3) so as to take part in transmitting torque to the propeller. The deformable device, $a$, has the form of a deep corrugation so that the one-piece body of the instrument consists of two flanges, $d$, $d$, attached to short lengths, $e$, $e$, of hollow shafting and connected by a deep outstanding corrugation comprising disc-like members, $f$, $f$, at right angles to the axis of the shaft or slightly coned, connected to each other by an annulus, $g$, of semicircular cross-section and to the hollow shafting by curves, $h$, $h$, of suitable radius. Within each end of the body, $a$, a flanged cone or thimble, $i$, $i'$, is respectively inserted, the flanged portion being recessed into a main flange, $d$, of the body of the device to which it may be secured by screw pins or otherwise. The cone members are preferably a neat fit within the main flanges, $d$, and are clear at other points, the bottom portions of the two cones being spaced apart at a suitable distance.

On a bracket, $k$, attached to the end of the cone, $i$, a small mirror, $m$, is pivotally mounted with its axis on or in proximity to the axis of the propeller shaft and transverse thereto, the mirror or spindle on which it is mounted being provided with a short lever, $n$, in operative relation to a link, $o$, attached to a bracket, $k'$, on the cone, $i'$, so that relative movement of the two cones causes the mirror to tilt.

The link, $o$, may be adjusted axially on its bracket, $k'$, by any suitable mechanism such as the block, $r$, to which the link, $o$, is secured, the screwed extension, $s$, and nut, $t$.

An appropriate source of light, such as the lamp, $u$, (see Figures 2 and 3) throws a beam on to the mirror, $m$, through suitable apertures, $v$, $v$, in the corrugation, other apertures being formed, if necessary, to provide access to the mirror and adjacent parts for adjusting purposes.

Preferably two opposite apertures, $v$, $v$, are provided in conjunction with a double-sided mirror, so that two flashes are obtained for each revolution of the shaft.

The lamp, $u$, is mounted on a scale-box, $w$, having an observation aperture, $x$, in one wall and a scale on the opposite wall, $z$.

The deformable bellows or concertina member, $a$, is so proportioned as regards strength and stiffness that while able to transmit the necessary torque, it yields to end thrust within the elastic limit so that its change of axial dimensions is proportional to the thrust; due to the mirror-operating mechanism provided the mirror is tilted and thereby also the spot of light on the scale deflected in proportion to the end thrust, the scale being calibrated in any convenient units of force.

Preferably a fixed mirror, 2, is secured to the cone, $i$, to give a datum, into coincidence with which the indications of the tilting mirror, $m$, may be brought when desired by the adjusting mechanism above described.

According to the form of the invention shown in Figures 5 and 6, cylindrical members, 3, $3^a$, telescoping into one another as shown, are substituted for the cones, $i$, $i'$. The member, 3, is detachably secured in place by means of screw pins, 4, connecting it to an inwardly projecting ring, 5, which is in turn secured to the flange portion of the deformable element by screw pins, 6, while the element, $3^a$, may be secured direct to the other end of the deformable element by means of pins, 7, passing through its flange, 8. The element, $3^a$, is provided at an intermediate point of its length as shown with a transverse partition, $9^a$, to carry the mirror-supporting bracket, $k$, holes, 10, being formed in the walls of this element for the passage of the beam of light and to provide access to the mirror and co-operating mechanism. The other element, 3, carries on its end a bracket, $k'$, on which is mounted the adjusting mechanism above described.

In operation the mirror-operating and mirror-supporting elements, 3 and $3^a$, attached to the deformable member can slide freely in relation to each other, but in order that the optical part of the apparatus may be assembled and adjusted before insertion within the concertina member, screw dowels, 11, are provided as shown to connect the elements, 3 and $3^a$. Thus, if after working it is desired to withdraw the mirrors for overhaul or adjustment, the concertina member, $a$, as a whole is first disconnected from the adjacent shafts and the dowel pins, 11, inserted so as to connect the two parts, 3 and $3^a$, which after removal of the screw pins, 4 and 7, can be withdrawn as a whole as indicated in Figure 6.

After adjustment of the mirrors, the parts, 3 and $3^a$, with the dowels in place are re-inserted within the bellows and secured in place by the pins, 4 and 7, the dowels being then removed so that the parts, 3 and $3^a$, of the apparatus are free to operate.

When the elements, 3 and $3^a$, connected by the dowel pins, 11, are first inserted into the concertina member or on any other occasion when necessary, one or more liners may be inserted between the member, 3, and the ring, 5, or elsewhere to ensure the correct relative positioning of the parts or alternatively the ring, 5, may be machined according to the nature of the adjustment required.

According to a modification of this part of the invention, as illustrated in Figure 7, the dowel pins may be omitted and a transverse partition, 9, be arranged in the element, 3. This element together with the element, $3^a$, may as before be telescopic or as shown, the element, $3^a$, may stop at the transverse partition, $9^a$, on which the mirror-supporting brackets are mounted. A plate, 12 is arranged as shown connected by bolts, 13, to the flange, 8, of the element, $3^a$, while bolts, 14, having appropriately spaced shoulders at 15 and 16, and passing through holes in the partition, $9^a$, connect the plate, 12, with the partition, 9.

With this modification, as in that above described, the mirrors and so forth can be adjusted before inserting the members, 3 and $3^a$, within the concertina, the plate, 12, and bolts, 14, being removed when the elements, 3 and $3^a$, have been secured in place by the screw pins, 7 and 4, respectively.

In addition to the holes provided in the concertina member, for the beam of light, further holes may be provided in appropriate positions for the ingress of ambient air to promote equalization of the temperature and thermal expansion of the various parts.

Although the invention has been described with reference to propeller shafts, it is equally applicable to other rotatable shafts or it may even be used to measure an end thrust on a non-rotating shaft.

Either positive or negative thrusts may be measured by devices according to the present invention.

It will be understood that many minor departures may be made from the precise constructions of thrust-measuring indicators described above without exceeding the scope of the invention.

By the term "shaft" in the accompanying claims it is to be understood not only the shaft proper but also the deformable member itself which by virtue of its ability to transmit both thrust and torsion is in effect a part of the shaft.

Having now described our invention, what we claim as new and desire to secure by Letters Patent is:—

1. Apparatus for measuring thrust, comprising in combination a shaft having a hollow deformable member apertured to permit access to the interior thereof of a beam of light; an optical device for measuring deformation of said member due to thrust, said optical device including light-reflecting means disposed within said deformable member, and means for operatively connecting said optical device with said shaft.

2. Apparatus for measuring thrust, comprising in combination a shaft having a hollow deformable member apertured to permit access to the interior thereof of a beam of light; an optical device for measuring deformation of said member due to thrust, said optical device including tiltable light-reflecting means disposed within said deformable member; and means for operatively connecting said optical device with said shaft.

3. Apparatus for measuring thrust, comprising in combination a shaft having a hollow deformable member apertured to permit access to the interior thereof of a beam of light; an optical device for measuring deformation of said member due to thrust, said optical device including a mirror disposed within said deformable member; and means for operatively connecting said optical device with said shaft.

4. Apparatus for measuring thrust, comprising in combination a shaft having a deformable bellows or concertina member apertured to permit access to the interior thereof of a beam of light; an optical device for measuring deformation of said member due to thrust, said optical device including light-reflecting means disposed within said deformable bellows or concertina member; and means for operatively connecting said optical device with said shaft.

5. Apparatus for measuring thrust, comprising in combination a shaft having a hollow deformable member apertured to permit access to the interior thereof of a beam of light; an optical device for measuring deformation of said member due to thrust, said optical device including light-reflecting means symmetrically disposed on the axis of said shaft; and means for operatively connecting said optical device with said shaft.

6. Apparatus for measuring thrust, comprising in combination a shaft having a hollow deformable member; an optical device for measuring deformation of said member due to thrust, said optical device including a double-sided mirror disposed on the axis of said shaft within said deformable member and opposite apertures operatively disposed in said deformable member in relation to said mirror for permitting access thereto of a beam of light; and means for operatively connecting said optical device with said shaft.

7. Apparatus for measuring thrust, comprising in combination a shaft having a hollow deformable member apertured to permit access to the interior thereof of a beam of light; an optical device for measuring deformation of said member due to thrust, said optical device including light-reflecting means disposed within said deformable member; together with means for supporting said light-reflecting means, and means for operating said light-reflecting means, said supporting and operating means being disposed within said deformable member and in rigid relation thereto.

8. Apparatus as claimed in claim 7, having means for temporarily connecting said supporting and said operating means, and having said deformable member open-ended so that said supporting and said operating means can be withdrawn from or inserted within said deformable means in a certain relation.

9. Apparatus as claimed in claim 7, in which the supporting and operating means are telescopically associated.

10. Apparatus for measuring thrust, comprising in combination a shaft having a hollow deformable member apertured to permit access to the interior thereof of a beam of light; an optical device for measuring deformation of said member due to thrust, said optical device including movable light-reflecting means disposed within said deformable member; means for operatively connecting said optical device with said shaft; and fixed light-reflecting means also disposed within said deformable member.

In testimony whereof we have signed our names to this specification.

CHARLES ALGERNON PARSONS.
STANLEY SMITH COOK.